(12) United States Patent
Macaluso et al.

(10) Patent No.: US 8,115,605 B2
(45) Date of Patent: Feb. 14, 2012

(54) POWER LINE COMMUNICATIONS DEVICE IN WHICH PHYSICAL COMMUNICATIONS PROTOCOL LAYER OPERATION IS DYNAMICALLY SELECTABLE

(75) Inventors: Michael J. Macaluso, Highland Park, NJ (US); Bo Zhang, Somerville, NJ (US); Oleg Logvinov, East Brunswick, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 933 days.

(21) Appl. No.: 10/583,830

(22) PCT Filed: Dec. 22, 2004

(86) PCT No.: PCT/US2004/043258
§ 371 (c)(1),
(2), (4) Date: Jun. 27, 2007

(87) PCT Pub. No.: WO2005/062915
PCT Pub. Date: Jul. 14, 2005

(65) Prior Publication Data
US 2007/0279196 A1   Dec. 6, 2007

Related U.S. Application Data

(60) Provisional application No. 60/532,098, filed on Dec. 23, 2003.

(51) Int. Cl.
*G05B 11/01* (2006.01)
*G08C 19/16* (2006.01)
*H04M 11/04* (2006.01)

(52) U.S. Cl. .......... 340/12.32; 340/12.33; 340/538; 340/538.11

(58) Field of Classification Search ........... 340/310.11, 340/12.32
See application file for complete search history.

(56) References Cited

U.S. PATENT DOCUMENTS

| | | | | |
|---|---|---|---|---|
| 5,497,398 A | * | 3/1996 | Tzannes et al. | 375/260 |
| 5,909,463 A | * | 6/1999 | Johnson et al. | 375/220 |
| 6,952,441 B2 | * | 10/2005 | Peeters | 375/222 |
| 7,075,941 B2 | | 7/2006 | Liu et al. | |
| 7,561,614 B2 | * | 7/2009 | Kodama et al. | 375/145 |
| 2001/0028678 A1 | * | 10/2001 | Kato et al. | 375/222 |
| 2002/0006167 A1 | * | 1/2002 | McFarland | 375/260 |
| 2002/0031226 A1 | * | 3/2002 | Simonsen et al. | 380/255 |

(Continued)

FOREIGN PATENT DOCUMENTS

JP   2001-094526   4/2001

(Continued)

OTHER PUBLICATIONS

Lee et al. "HomePlug 1.0 powerline communication LANs—protocol description and performance results", International Journal of Communication Systems, vol. 16, Issue 5, pp. 447-473, Jun. 2003.

(Continued)

*Primary Examiner* — Donnie Crosland
(74) *Attorney, Agent, or Firm* — Slater & Matsil, L.L.P.

(57) ABSTRACT

A power line communications PLC transmitter and receiver device includes a physical communications protocol layer that provides for dynamic selection of a communications signal transmission operating mode from a plurality of such modes, where each has a corresponding transmission data structure that is based on characteristics of the electric power distribution network to which the PLC device is to be coupled and also the communications protocol profile requirements for the network.

26 Claims, 2 Drawing Sheets

U.S. PATENT DOCUMENTS

| | | | |
|---|---|---|---|
| 2007/0121676 A1* | 5/2007 | Koga et al. | 370/482 |
| 2007/0223360 A1* | 9/2007 | Ichihara | 370/204 |
| 2007/0279196 A1* | 12/2007 | Macaluso et al. | 340/310.12 |

FOREIGN PATENT DOCUMENTS

| | | |
|---|---|---|
| JP | 2003-264485 | 9/2003 |

OTHER PUBLICATIONS

Rauschmayer, "ADSL/VDSL Principles", Macmillan Technical Publishing, p. 171, 1999.

ITU-T "G.992.1 Recommendation", ITU-T, pp. 9-13, Jun. 1999.

Gardner "HomePlug Standard Brings Networking to the Home", Communication Systems Design, vol. 6, No. 12, Dec. 2000.

Lee et al. "HomePlug 1.0 powerline communication LANs—protocol description and performance results version 5.4", International Journal of Communication Systems, pp. 1-25, 2000.

Lee, M.K., et al., "HomePlug 1.0 Powerline Communication LANs—*Protocol Description and Performance Results version 5.4*," International Journal of Communication Systems, Sep. 18, 2002, v.1.01, John Wiley & Sons, Ltd.

Sun, M.C., et al., "Power-Line Communications using DWMT Modulation," IEEE International Symposium on Circuits and Systems, 2002, pp. IV-493-IV-496, vol. 4.

* cited by examiner

POWER LINE COMMUNICATIONS DEVICE IN WHICH PHYSICAL COMMUNICATIONS PROTOCOL LAYER OPERATION IS DYNAMICALLY SELECTABLE

CROSS REFERENCE TO RELATED APPLICATION

This application claims the benefit of U.S. Provisional Application Ser. No. 60/532,098, filed Dec. 23, 2003, assigned to the assignee of this application and incorporated by reference herein.

FIELD OF THE INVENTION

The present invention relates generally to communications over a power line communications ("PLC") network and, more particularly, to providing a physical communications protocol layer in a PLC transmitter and/or receiver device whose communications signal transmission modes of operation are dynamically selectable in view of characteristics of a conventional electric power distribution network on which communications is performed and communications protocol requirements for the PLC network.

BACKGROUND OF THE INVENTION

With the continuing development of and advances in power line communications technologies, it is expected that power line communications ("PLC") systems eventually will be installed on electric power distribution networks or grids existing throughout the world.

It is well known in the art that an electric power distribution network, which is composed of conventional electric power lines and wires and associated power transformer equipment, can operate to convey electricity along the electric lines and wires having voltages from about 90 VAC to 20 KVAC and frequencies from about 40 Hz to 400 Hz. The physical communications protocol layer component of PLC transmitter and receiver devices that form a PLC system, therefore, must operate in relation to the ranges of voltages and frequencies associated with the electric power distribution network on which the PLC devices are installed to ensure that communication over the PLC network is maintained robust.

In current PLC transmitter and receiver devices, the physical communication protocol layer is designed to operate according to the characteristics of the electric power distribution network for which installation of the PLC device is planned. In some PLC transmitter and receiver device implementations in areas of the world where the physical network topology is small in size and relatively free of communication impairments, a high degree of spectral containment is desirable, in other words, PLC transmissions desirably occur utilizing the maximum available spectrum and also the maximum possible length of PLC transmission, which is commonly referred to as the symbol length. In other PLC transmitter and receiver device implementations, the PLC transmissions need to occur in the presence of impairments to communications, such as multi-path fading or reflections that place limitations upon the maximum available symbol length. In many current PLC system implementations, the PLC devices operate in accordance with standard OFDM communication principles conventional in the art, such as those included in the HomePlug 1.0 communications standard specification, which is incorporated by reference herein. Still other PLC transmitter and receiver device implementations need to provide for compatibility with existing or legacy PLC equipment that operate in accordance with different communications protocol requirements.

Therefore, there exists a need for a low cost physical communications protocol layer architecture for inclusion in a PLC transmitter and/or receiver device which provides for dynamic selection of a mode of communications signal transmission operation from a plurality of communications signal transmission operation modes to make the PLC device compatible with a plurality of PLC communications protocol requirements and also the characteristics of the electric power distribution network on which the PLC device is installed.

SUMMARY OF THE INVENTION

In accordance with the present invention, a power line communications ("PLC") transmitter and/or receiver device includes a physical communications protocol layer module that dynamically, and preferably automatically, selects communications operation from a plurality of communications signal transmission modes having respective transmission data structures. The selecting is performed based on PLC communications protocol profile requirements and transmission performance characteristics of the electric power distribution network upon which the PLC device is installed.

In a preferred embodiment, the physical communications protocol layer module operates in accordance with transmission modes corresponding either to a wavelet-based multi-carrier communication block transmission data structure or a standard, well known in the art OFDM communication block transmission data structure. In a further preferred embodiment, the physical layer module is operable to provide for compatibility with the HomePlug 1.0 communications protocol requirement.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which.

DETAILED DESCRIPTION OF THE INVENTION

The inventive power line communications ("PLC") transmitter and/or receiver device includes a physical communications protocol layer module that provides for dynamic, and preferably automatic, selection of a communications signal transmission operating mode in view of PLC network transmission parameters and the communications protocol profile requirements for the network.

Figure 1:
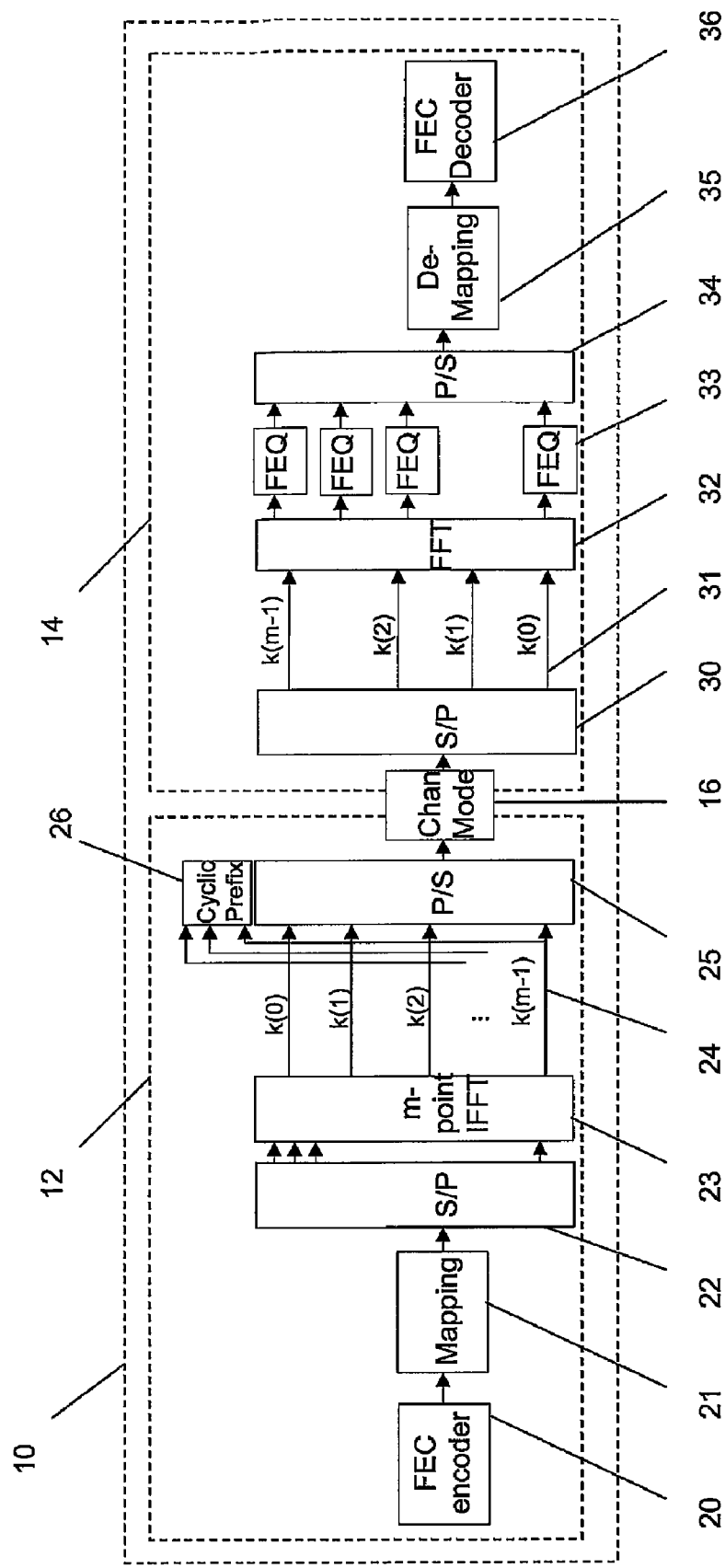
FIG. 1 is a block diagram illustrating exemplary, prior art physical communications protocol layer ("PHY") components included in a power line communications transmitter and a power line communications receiver of a power line communications system.

For purposes of highlighting the features of the present invention, an exemplary, prior art PLC system 10, as shown in FIG. 1 and which includes a PLC transmitter 12 coupled to a PLC receiver 14 via a PLC network 16 that includes conventional electric power wires, is initially described. Each of the PLC transmitter 12 and the PLC receiver 14 contains conventional physical communications protocol layer components including standard OFDM functional blocks, which are well known in the art. Referring to FIG. 1, the PLC transmitter 12 includes a forward error correction ("FEC") encoder module 20, a data mapping module 21, a serial to parallel conversion: module 22 and an m number of points inverse fast fourier transform ("IFFT") module 23 connected to each other in the recited sequence. The module 23 generates a plurality of frequency carrier data signals 24, which carry transmission data or overhead data, and the signals 24 are routed into a parallel to serial transmission symbol creation module 25 and a cyclic prefix module 26. The symbol creation module 25 and the cyclic prefix module 26 are connected through a PLC interface (not shown) to the PLC network 16.

Referring again to FIG. 1, the PLC receiver 14 includes a serial to parallel symbol detection module 30 connected through a PLC interface (not shown) to the PLC network 16. The module 30 separates the data contained within the transmitted symbol and cyclic prefix based on the frequency of the carrier signal 31 on which the data was carried, and forwards the respective carrier signals to the fast fourier transform ("FFT") module 32. The PLC receiver 14 further includes equalization modules 33, a parallel to serial data conversion module 34, a de-mapping module 35 and an FEC decoder module 36 connected to each other in the recited sequence. The above-described PHY layer modules of the PLC transmitter 12 and the PLC receiver 14 perform functions consistent with a typical, prior art OFDM system where only a single communications signal transmission operating mode corresponding to a specific transmission data structure is available for use in transmitting communications data on carrier signals over the PLC network 16.

Figure 2:
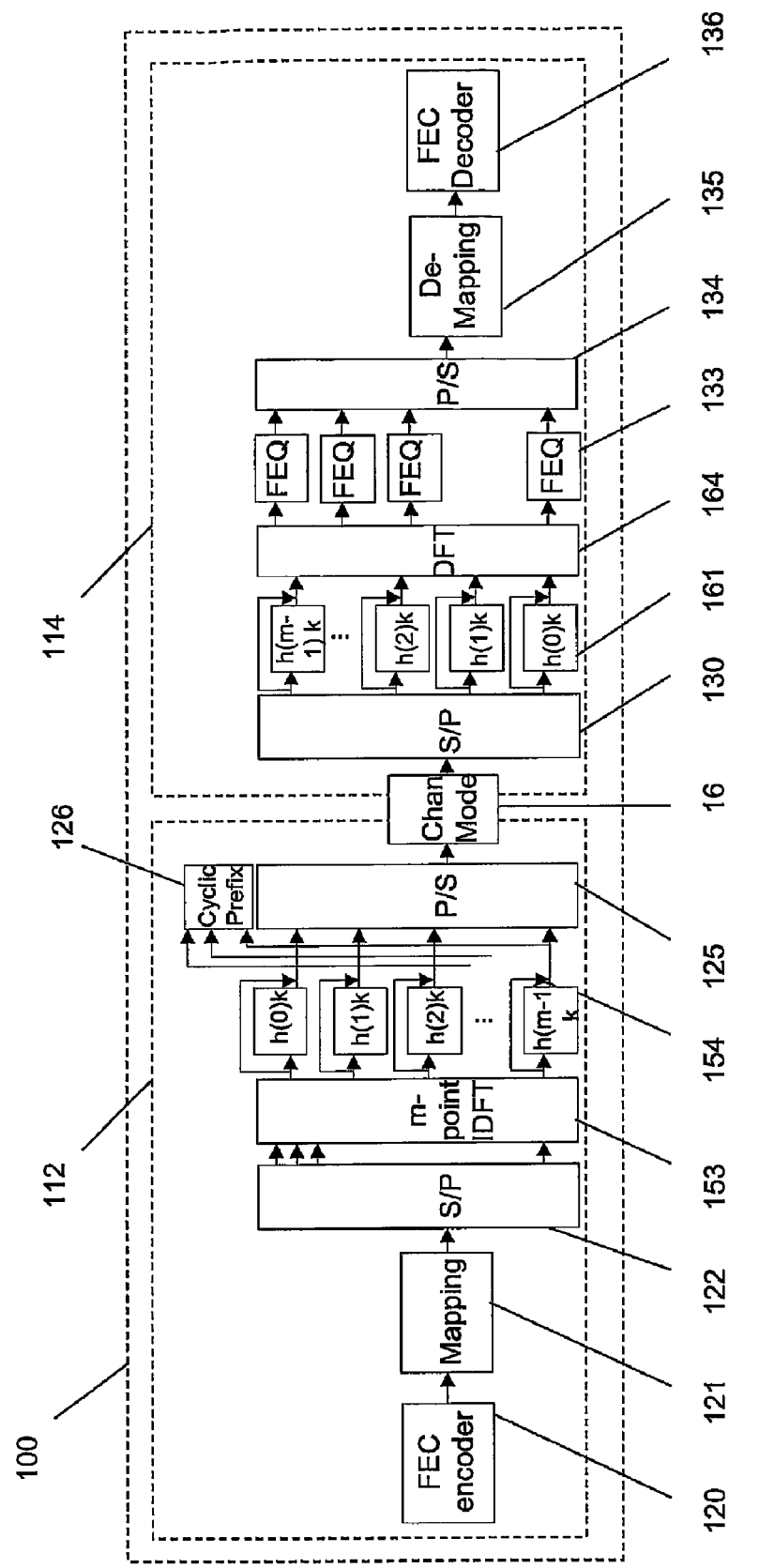
FIG. 2 is a block diagram of a PLC transmitter and a PLC receiver in a power line communications system, where each of the PLC devices include PHY layer components, in accordance with the present invention, that are dynamically configurable for performing data processing operations in accordance with a selected one of a plurality of communications signal transmission operating modes.

In accordance with the present invention, an exemplary PLC system 100, as shown in FIG. 2, includes a PLC transmitter 112 and a PLC receiver 114 where each of the transmitter 112 and receiver 114 contains physical communications protocol components that provide for selection of a communications signal transmission operating mode from a plurality of communications signal transmission operating modes that respectively correspond to a transmission data structure defined in accordance with power line network operating characteristics and communication protocol requirements. Referring to FIG. 2, the PLC transmitter 112 is coupled to the PLC receiver 114 via a PLC network 16 comprising conventional electric power lines and wires. As discussed in detail below, the configuration and parameters of the functional blocks in the inventive PLC transmitter 112 and the inventive PLC receiver 114 provide that multiple modes of PLC communications signal transmission operation are available and that the PHY components within the PLC transmitter and PLC receiver are dynamically configurable to perform data processing operations based on the selected mode. The PLC devices 112 and 114, in accordance with the present invention, can be suitably designed, such as by use of modular hardware and reprogrammable software, to provide for dynamic, and preferably automatic, selection among any plurality of communications operating modes, as desired, at the physical communications protocol layer.

Referring to FIG. 2, the transmitter 112 includes a communications operating mode selection module 154 that couples inverse fourier transform ("IDFT") module 153 to symbol creation module 125 and cyclic prefix module 126, where the modules 153, 125 and 126 support multiple modes of communications operation and are dynamically configurable to perform data processing operations based on the mode selected at the module 154. In addition, the receiver 114 includes a communications operating mode selection module 161 that couples a serial to parallel symbol detection module 130 to a fourier transform ("DFT") module 164, where the modules 130, 161 and 164 support multiple modes of communications operation and are dynamically configurable to perform data processing operations based on the mode selected at the module 161.

In a preferred embodiment, an FEC encoder module 120, a mapping module 121 and a serial to parallel data conversion module 122, which are connected to each other in the recited sequence in the PLC transmitter 114 and where the module 122 is coupled to the IDFT module 153, are dynamically, and preferably automatically, configurable to perform data processing based on the communications operating mode selected at the IDFT module 153. Further, an equalization module 133, a parallel to serial data conversion module 134, a demapping module 135 and a FEC decoder module 136, which are connected to each other in the recited sequence in the PLC receiver 114 and where the module 133 is coupled to the DFT module 164, are dynamically, and preferably automatically, configurable to perform data processing operations based on the communications operating mode selected at the module 161. For example, each of the IDFT module 153 and DFT module 164 can be reconfigured to change its size or number of points (the m value), as well as its frequency of operation, based upon, for example, the available frequency band of a particular network or region or the operating network characteristics. In addition, the IDFT module 153 and DFT module 164 can increase their size and frequency to provide additional bandwidth for data communication on networks or at times when it is possible, and can then be reconfigured back to standard parameters for legacy operations, or to communicate with legacy devices.

In a further preferred embodiment, the FEC encoder 120 and the FEC decoder 136 can be reconfigured to perform Reed-Solomon and Convolutional coding when a standard or legacy mode of operation is selected, and also be configured to perform data processing operations in accordance with another selected mode of operation that includes Reed-Solomon and Trellis coding, which would be used in noisier or more dynamic networks where additional error correction is required or where different coding methods yield better results.

In a preferred embodiment, the PHY modules in the PLC transmitter 112 and the PLC receiver 114 include a communications operating mode selection functionality that can be set based upon pre-configuration, boot-up or run-time parameters. In addition, factors such as geographic location, existent network type and typology or run-time analysis of the operating network can be used to determine the operating mode.

In a further embodiment, the mode selection is based on control signals provided by an external processor, such as a PC for example (not shown), that is connected to the PHY layer modules of the inventive PLC transmitter and/or receiver devices, or can be based on the processing of network response characteristics calculated from transmitted and received signal data provided to the inventive PLC device. Based on the control signals, the PLC transmitter 112 automatically selects one of a plurality of communications operating modes corresponding to a specific transmission data structure for use in transmitting communications data on carrier signals over the PLC network 16, and the PLC receiver 114 also operates in accordance with the selected mode. Each of the modes defines transmission parameters for the data transmission structure, such as preamble length, symbol length, size of the transmission block, number carriers available for transmission and frequency bandwidth per carrier.

In the preferred illustrated embodiment, the processor connected to the PHY layer modules of the inventive PLC transmitter and/or receiver device can automatically and dynamically select between two communications operating modes to maximize use of available bandwidth on the PLC network. In a preferred embodiment, the PLC transmitter 112 and receiver 114 provide for selection of communications operating modes corresponding to either the wavelet filtered-band OFDM or FFT OFDM transmission data structure, or the conventional FFT-based OFDM communications transmission data structure.

In a preferred embodiment, the selection modules 154 and 161 include processing blocks that perform wavelet function processing when the PHY layer of the PLC transmitter and PLC receiver, respectively, are configured to operate in that mode. Further, as in the preferred embodiment illustrated in FIG. 2, the selection modules 154 and 161 include dedicated signal paths for bypassing wavelet processing blocks when the PLC devices operate in a normal or legacy communications operations mode. Depending upon the selected operating mode, the modules 154 and 161 operate to selectively insert or remove the cyclic prefix portion of the data transmission symbol for a data transmission structure.

In a preferred embodiment, the processor selects the wavelet mode where the electric power distribution network on which the PLC device is installed is relatively small in size, such as existing in a residential community, or not likely to experience high levels of reflections of communications signals that result from multi-path fading. When the PLC device 112 performs communications operations in accordance with the wavelet mode, the processor transmits control data to the modules 125 and 126 that causes omission of the cyclic prefix from the transmission data block, thereby obtaining the highest throughput on the PLC network. As well known in the art, a PLC system operating using the filtered-band OFDM communications mode performs at satisfactory levels only when the length of a multi-path reflection is about 10% of the symbol length of a transmission data block.

In a preferred embodiment, when the processor selects the conventional FFT-based OFDM communications operations mode, the wavelet processing blocks of the selection modules 154 and 161 are not used and, instead, the bypass paths are used, as shown diagrammatically in the preferred embodiment illustrated in FIG. 2. The conventional FFT-based OFDM mode is preferable for large scale power distribution networks, or a PLC network where the impulse response length is longer than 10% of the symbol length. In the conventional OFDM mode, the processor provides control data to the modules 126 and 126 so that the module 126 inserts a cyclic prefix at the beginning of the symbol.

In a preferred embodiment, the processor external to, or within the PLC transmitter device 112, continuously and automatically selects, or attempts to select, a mode for the transmission data structure to maximize use of the bandwidth available on the PLC network. In still a further preferred embodiment, the processor external to, or within the PLC transmitter device 112, analyzes power line network characteristics data continuously provided thereto through the PHY layer operation and continues to monitor the network performance for the available modes so that a specific mode is selected or the specifically selected mode can be further optimized in view of the network characteristics.

In a preferred embodiment, the selection module 154 of the PLC transmitter 112 selects an operating mode based on the size of a symbol corresponding to an identified communications connection oriented profile. This selection capability improves channel utilization efficiency as smaller and, therefore shorter, symbols can be selected for intolerable channel conditions for small payloads, such as voice codec packets.

Although preferred embodiments of the present invention have been described and illustrated, it will be apparent to those skilled in the art that various modifications may be made without departing from the principles of the invention.

The invention claimed is:

1. A power line communications ("PLC") device having at least one of communications data transmission and reception capabilities comprises a physical communications protocol layer module adapted for operating in accordance with a plurality of communications signal transmission operating modes, wherein the physical layer module includes:
   a module for performing Fourier transform operations, wherein the Fourier module is dynamically configurable to select different data processing operations in accordance with a selected communications signal transmission operating mode;
   a selection module coupled to the Fourier transform module, wherein:
   the selection module provides for selection between different communications signal transmission operating modes for the PLC device from the plurality of communications signal transmission modes,
   each of the communications signal transmission modes corresponds to a different transmission data structure defined in accordance with power line network operating characteristics and communication protocol requirements, and
   the communications signal transmission modes comprise a wavelet filtered band OFDM mode and a non-wavelet filtered band OFDM mode; and
   a module for converting between parallel and serial symbol data coupled to the selection module, wherein the symbol data converting module processes a transmission data block for the power line network based on the operating mode selected by the selection module.

2. The PLC device of claim 1, wherein the selection module automatically selects the mode based on control data.

3. The PLC device of claim 1, and wherein the modes are operable on electric power lines having predetermined operating voltages and frequencies.

4. The PLC device of claim 1, wherein the selection module selects a mode based on data obtained from dynamic channel analysis of the power line network.

5. The PLC device of claim 1, wherein the selection module selects a mode based on data representative of communications profile requirements of the power line network.

6. The PLC device of claim 1, wherein the selection module selects a mode based on data representative of a communications connection oriented profile.

7. The PLC device of claim 1, wherein the selection module selects a mode based on the size of a symbol corresponding to an identified communications connection oriented profile.

8. The PLC device of claim 1, wherein a portion of at least one of the Fourier transform, selection and data converting modules is implemented using a system on a chip architecture.

9. The PLC device of claim 8, wherein the PLC device further includes at least one of a module for performing error correction, a module for performing data mapping, an equalization module and a module for converting between serial and parallel data, and wherein a portion of at least one of the error correction module, data mapping module, equalization module and data converting module is implemented using the system on a chip architecture.

10. The PLC device of claim 1, wherein at least one of the Fourier transform, selection and data converting modules is implemented in software.

11. The PLC device of claim 1, wherein the PLC device further includes at least one of a module for performing error correction, a module for performing data mapping, an equalization module and a module for converting between serial and parallel data, and wherein the at least one module is configurable for performing data processing in accordance with the selected mode.

12. A power line communications ("PLC") method for operating in accordance with a plurality of communications signal transmission operating modes for transmitting and/or receiving PLC signals, the method comprising:
  selecting a power line communications signal transmission operating mode from the plurality of communications signal transmission operating modes, wherein each of the modes corresponds to a transmission data structure defined in accordance with power line network operating characteristics and communication protocol requirements, wherein the communications signal transmission operating modes include a wavelet filtered OFDM-based mode and a non-wavelet filtered OFDM-based mode;
  performing Fourier transform operations in accordance with the selected communications signal transmission operating mode; and
  converting between parallel and serial symbol data coupled to the selection module, comprising processing a transmission data block for the power line network based on the selected communications signal transmission operating mode.

13. The PLC method of claim 12, wherein selecting a power line communications signal transmission operating mode comprises automatically selecting the mode based on control data.

14. The PLC method of claim 12, wherein the communications signal operating modes are operable on electric power lines having predetermined operating voltages and frequencies.

15. The PLC method of claim 12, wherein selecting a power line communications signal transmission operating mode comprises selecting the mode based on data obtained from dynamic channel analysis of the power line network.

16. The PLC method of claim 12, wherein selecting a power line communications signal transmission operating mode comprises selecting the mode based on data representative of communications profile requirements of the power line network.

17. The PLC method of claim 12, wherein selecting a power line communications signal transmission operating mode comprises selecting a mode based on data representative of a communications connection oriented profile.

18. The PLC method of claim 12, wherein selecting a power line communications signal transmission operating mode comprises selecting the mode based on the size of a symbol corresponding to an identified communications connection oriented profile.

19. The PLC method of claim 12, wherein a portion of at least one of the Fourier transform, selection and data converting is implemented using a system on a chip architecture.

20. The PLC method of claim 19, further comprising performing at least one of error correction, data mapping, and converting between serial and parallel data using the system on a chip architecture.

21. The PLC method of claim 12, wherein at least one of the Fourier transform, selection and data converting is implemented in software.

22. The PLC method of claim 12, further comprising performing at least one of error correction, data mapping, and converting between serial and parallel data based on a configuration for data processing selected in accordance with the selected mode.

23. The PLC device of claim 1, wherein the selection module comprises a processing block being activated in a first communications signal transmission operating mode and deactivated in a second communications signal transmission operating mode.

24. The PLC device of claim 23, wherein the first communications signal transmission operating mode comprises the wavelet filtered band OFDM mode, and wherein the processing block comprises a wavelet function processing block.

25. The PLC device of claim 24, wherein the wavelet function processing block comprises a plurality of wavelet function processing blocks, each of the plurality of wavelet processing blocks coupled between corresponding channels of the module for performing Fourier transform operations and the module for converting between parallel and serial symbol data.

26. The PLC device of claim 23, wherein the selection module further enables the transmission of a cyclic prefix in the second communications signal transmission operating mode and disables the transmission of the cyclic prefix in the first communication operating mode.

* * * * *